US012306325B2

(12) United States Patent
Yerramalli et al.

(10) Patent No.: US 12,306,325 B2
(45) Date of Patent: *May 20, 2025

(54) POSITIONING IN NETWORKS WITH FREQUENCY REUSE

(71) Applicant: QUALCOMM Incorporated, San Diego, CA (US)

(72) Inventors: Srinivas Yerramalli, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,702

(22) Filed: Oct. 18, 2023

(65) Prior Publication Data
US 2024/0045018 A1    Feb. 8, 2024

Related U.S. Application Data

(63) Continuation of application No. 17/013,022, filed on Sep. 4, 2020, now Pat. No. 11,828,865.
(Continued)

(51) Int. Cl.
*G01S 5/06* (2006.01)
*H04L 5/00* (2006.01)
(Continued)

(52) U.S. Cl.
CPC .............. *G01S 5/06* (2013.01); *H04L 5/0048* (2013.01); *H04L 41/0803* (2013.01);
(Continued)

(58) Field of Classification Search
CPC ..... G01S 5/06; H04L 5/0048; H04L 41/0803; H04W 16/14
(Continued)

(56) References Cited

U.S. PATENT DOCUMENTS

2015/0018010 A1    1/2015  Fischer
2018/0217228 A1    8/2018  Edge et al.
(Continued)

FOREIGN PATENT DOCUMENTS

CN    103314613 A        9/2013
CN    104247493 B   *    5/2018    ............ H04W 24/10
(Continued)

OTHER PUBLICATIONS

Alcatel Lucent: "Further More Discussion of Measurement Gap Enhancement", 3GPP TSG-RAN WG4 Meeting #76, R4-154365, No. Beijing, China, Aug. 24, 2015-Aug. 28, 2015, 5 Pages, Aug. 28, 2015.
(Continued)

*Primary Examiner* — Harry K Liu
(74) *Attorney, Agent, or Firm* — Muncy, Geissler, Olds & Lowe, P.C.

(57) ABSTRACT

Disclosed are techniques for wireless communication. In an aspect, a user equipment (UE) receives, from a serving cell operating on a first frequency, an inter-frequency communication gap configuration specifying at least one period of time during which the UE is permitted to tune from the first frequency to a second frequency to perform a positioning operation, wherein one or more neighboring cells of the serving cell are operating on the second frequency, tunes from the first frequency to the second frequency at a start of the at least one period of time, and performs, during the at least one period of time, the positioning operation on the second frequency.

30 Claims, 14 Drawing Sheets

Related U.S. Application Data

(60) Provisional application No. 62/905,840, filed on Sep. 25, 2019.

(51) Int. Cl.
   *H04L 41/08* (2022.01)
   *H04L 41/0803* (2022.01)
   *H04W 16/14* (2009.01)
   *H04W 84/04* (2009.01)
   *H04W 88/02* (2009.01)

(52) U.S. Cl.
   CPC .......... *H04W 16/14* (2013.01); *H04W 84/042* (2013.01); *H04W 88/02* (2013.01)

(58) Field of Classification Search
   USPC ........................................................ 342/451
   See application file for complete search history.

(56) References Cited

U.S. PATENT DOCUMENTS

| | | |
|---|---|---|
| 2019/0260487 A1 | 8/2019 | Kazmi et al. |
| 2021/0088623 A1 | 3/2021 | Yerramalli et al. |

FOREIGN PATENT DOCUMENTS

| | | |
|---|---|---|
| CN | 109804575 A | 5/2019 |
| EP | 3399810 A1 | 11/2018 |
| WO | 2018217323 A1 | 11/2018 |

OTHER PUBLICATIONS

Fischer S., "Introduction to OTDOA on LTE Networks", Qualcomm Technologies Inc, Aug. 7, 2014, pp. 1-18.

Nokia et al., "Discussion on Need for Measurement Gap in NR", 3GPP TSG-RAN WG4#84bis, R4-1710646, No. Dubrovnik, Croatia, Oct. 9, 2017-Oct. 13, 2017, 3 Pages, Oct. 13, 2017.

Qualcomm Incorporated: "Measurement Gap Configuration in Dual Connectivity", 3GPP TSG-RAN WG2 Meeting#86, R2-142517, Seoul, KR, May 19-23, 2014, May 19, 2014, 3 pages, URL: http://www.3gpp.org/ftp/tsg_ran/WG2_RL2/TSGR2_86/Docs/R2-142517.zip.

International Preliminary Report on Patentability—PCT/US2020/049720—The International Bureau of WIPO—Geneva, Switzerland—Apr. 7, 2022.

International Search Report and Written Opinion—PCT/US2020/049720—ISA/EPO—Dec. 23, 2020.

Huawei, et al., "Physical Layer Procedure for NR Positioning", 3GPP TSG RAN WG1 #97, R1-1906055, Reno, USA, May 13-17, 2019, May 3, 2019, 14 Pages.

Huawei, et al., "TP For Adding Proper References for TR36.855 Into TR37.857", 3GPP TSG RAN WG1 meeting #82, R1-154350, Beijing, China, Aug. 24-28, 2015, Aug. 15, 2015, 13 Pages.

Huawei: "Remaining Issues on DL Based Positioning", 3GPP TSG RAN WG1 Meeting #96, R1-1901574, Athens, Greece, Feb. 25-Mar. 1, 2019, Feb. 15, 2019, 8 Pages.

Intel Corporation: "Discussion on Continuous Uplink Transmissions in eMTC", 3GPP TSG RAN WG1 Meeting #85, R1-165224, Nanjing, China, May 23-27, 2016, May 14, 2016, pp. 1-3.

Intel Corporation: "Physical Layer Measurements for NR Positioning", 3GPP TSG RAN WG1 Meeting #98, R1-1908661, Intel—Measurements, 3rd Generation Partnership Project, Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019, pp. 1-20, XP051765269.

Taiwan Search Report—TW109130599—TIPO—May 6, 2024.

\* cited by examiner

POSITIONING IN NETWORKS WITH FREQUENCY REUSE

CROSS-REFERENCE TO RELATED APPLICATIONS

The present Application for patent is a continuation of U.S. application Ser. No. 17/013,022, entitled "POSITIONING IN NETWORKS WITH FREQUENCY REUSE," filed Sep. 4, 2020, which claims the benefit of U.S. Provisional Application No. 62/905,840, entitled "POSITIONING IN NETWORKS WITH FREQUENCY REUSE," filed Sep. 25, 2019, each of which is assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, also referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving, from a serving cell operating on a first frequency, an inter-frequency communication gap configuration specifying at least one period of time during which the UE is permitted to tune from the first frequency to a second frequency to perform a positioning operation, wherein one or more neighboring cells of the serving cell are operating on the second frequency; tuning from the first frequency to the second frequency at a start of the at least one period of time; and performing, during the at least one period of time, the positioning operation on the second frequency.

In an aspect, a method of wireless communication performed by a serving cell operating on a first frequency includes transmitting, to a UE, an inter-frequency communication gap configuration specifying at least one period of time during which the UE is permitted to tune from the first frequency to a second frequency to perform a positioning operation, wherein one or more neighboring cells of the serving cell are operating on the second frequency; refraining from transmitting to the UE during the at least one period of time; and receiving, from the UE, a result of the positioning operation after the at least one period of time.

In an aspect, a UE includes a memory; at least one transceiver; and at least one processor communicatively coupled to the memory and the at least one transceiver, the at least one processor configured to: receive, from a serving cell operating on a first frequency, via the at least one transceiver, an inter-frequency communication gap configuration specifying at least one period of time during which the UE is permitted to tune from the first frequency to a second frequency to perform a positioning operation, wherein one or more neighboring cells of the serving cell operate on the second frequency; cause the at least one transceiver to tune from the first frequency to the second frequency at a start of the at least one period of time; and perform, during the at least one period of time, the positioning operation on the second frequency.

In an aspect, a serving cell operating on a first frequency includes a memory; at least one transceiver; and at least one processor communicatively coupled to the memory and the at least one transceiver, the at least one processor configured to: cause the at least one transceiver to transmit, to a UE, an inter-frequency communication gap configuration specifying at least one period of time during which the UE is permitted to tune from the first frequency to a second frequency to perform a positioning operation, wherein one or more neighboring cells of the serving cell operate on the second frequency; cause the at least one transceiver to refrain from transmitting to the UE during the at least one period of time; and receive, from the UE via the at least one transceiver, a result of the positioning operation after the at least one period of time.

In an aspect, a UE includes means for receiving, from a serving cell operating on a first frequency, an inter-frequency communication gap configuration specifying at least one period of time during which the UE is permitted to tune from the first frequency to a second frequency to perform a positioning operation, wherein one or more neighboring cells of the serving cell operate on the second frequency; means for tuning from the first frequency to the second frequency at a start of the at least one period of time; and means for performing, during the at least one period of time, the positioning operation on the second frequency.

In an aspect, a serving cell operating on a first frequency includes means for transmitting, to a UE, an inter-frequency communication gap configuration specifying at least one period of time during which the UE is permitted to tune from a first frequency to a second frequency to perform a positioning operation, wherein one or more neighboring cells of the serving cell operate on the second frequency; means for refraining from transmitting to the UE during the at least one period of time; and means for receiving, from the UE, a result of the positioning operation after the at least one period of time.

In an aspect, a non-transitory computer-readable medium storing computer-executable instructions include computer-executable instructions comprising at least one instruction instructing a UE to receive, from a serving cell operating on a first frequency, an inter-frequency communication gap configuration specifying at least one period of time during which the UE is permitted to tune from the first frequency to a second frequency to perform a positioning operation, wherein one or more neighboring cells of the serving cell operate on the second frequency; at least one instruction instructing the UE to tune from the first frequency to the second frequency at a start of the at least one period of time; and at least one instruction instructing the UE to perform, during the at least one period of time, the positioning operation on the second frequency.

In an aspect, a non-transitory computer-readable medium storing computer-executable instructions includes computer-executable instructions comprising at least one instruction instructing a serving cell operating on a first frequency to transmit, to a UE, an inter-frequency communication gap configuration specifying at least one period of time during which the UE is permitted to tune from the first frequency to a second frequency to perform a positioning operation, wherein one or more neighboring cells of the serving cell operate on the second frequency; at least one instruction instructing the serving cell to refrain from transmitting to the UE during the at least one period of time; and at least one instruction instructing the serving cell to receive, from the UE, a result of the positioning operation after the at least one period of time.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
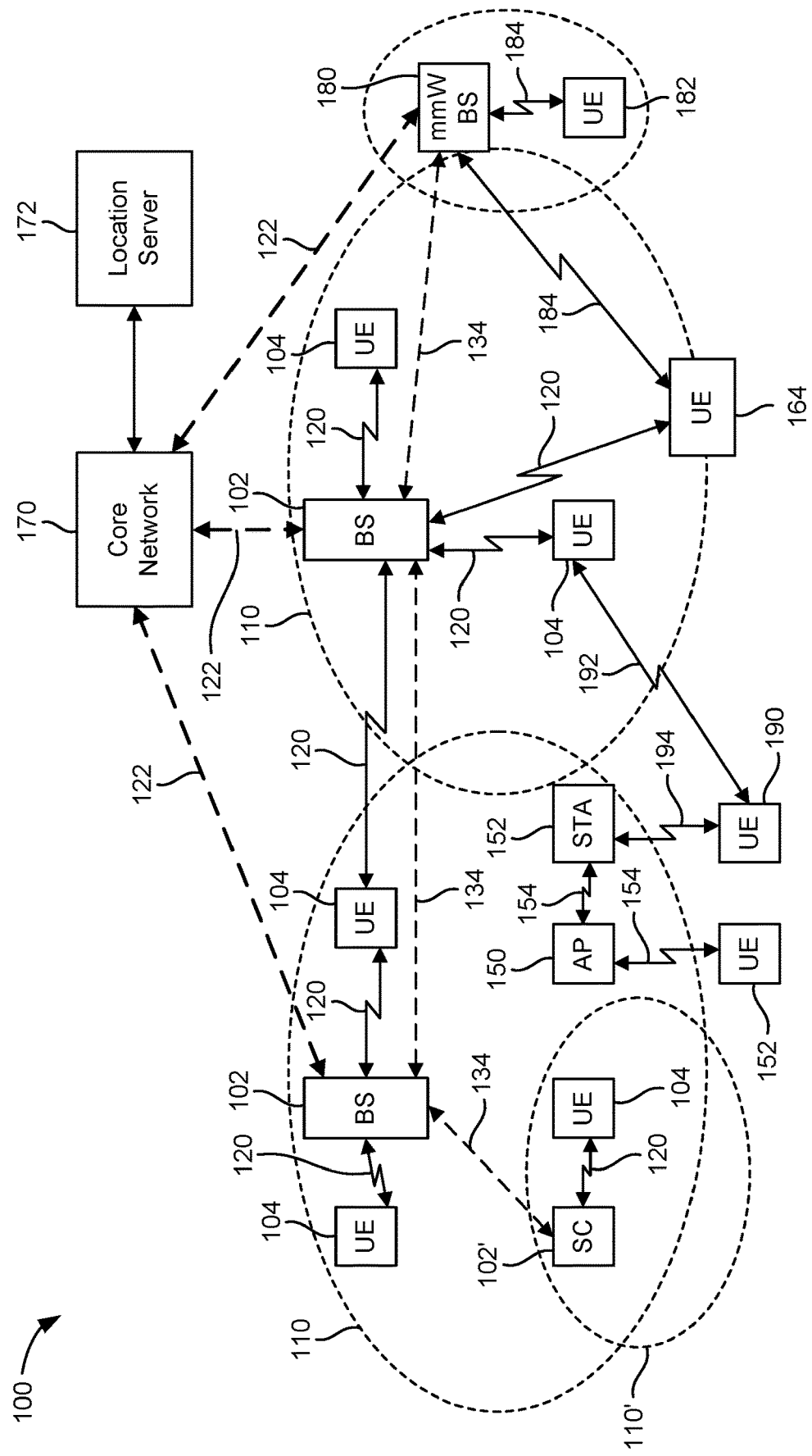
FIG. 1 illustrates an exemplary wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
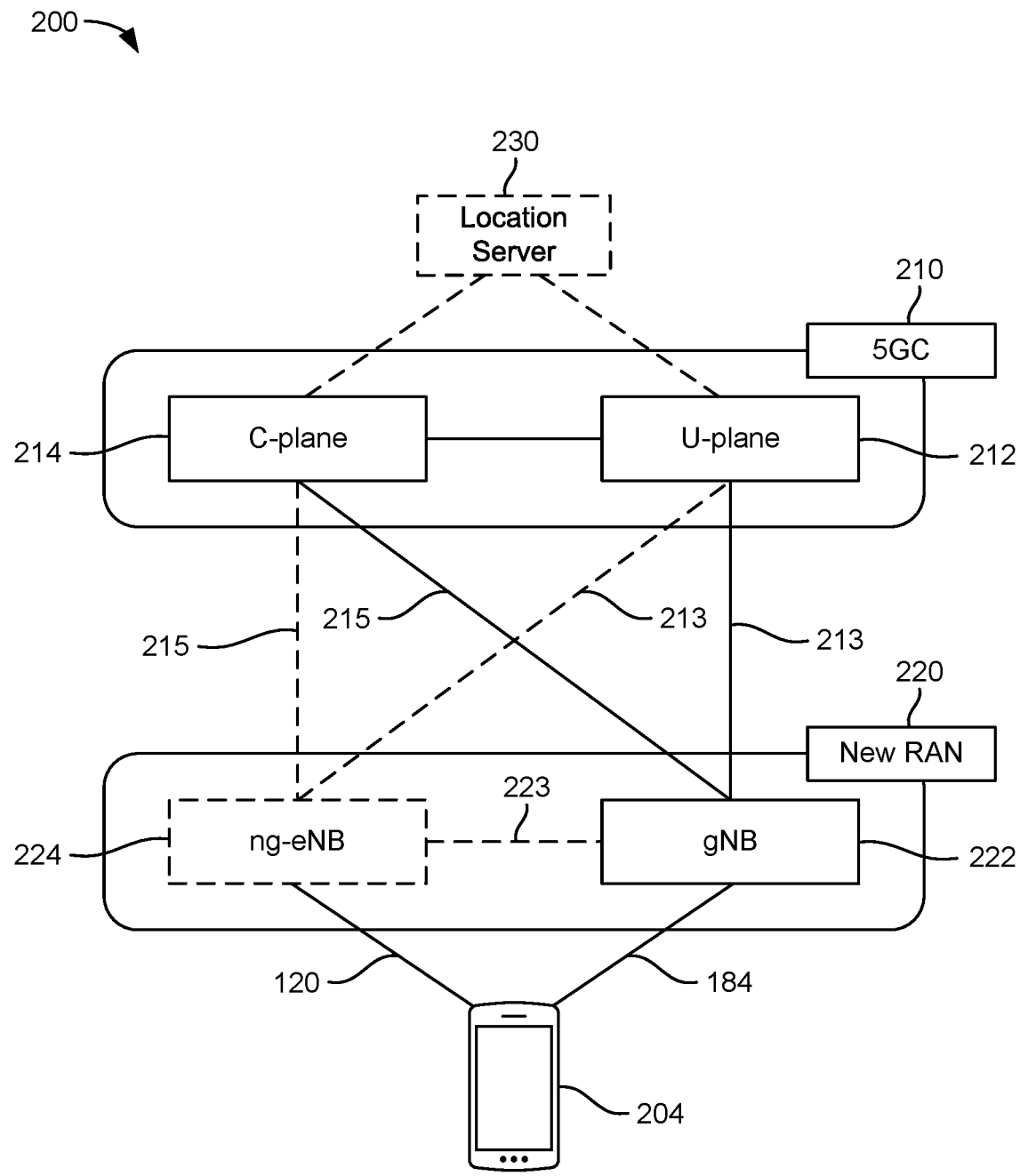
FIGS. 2A and 2B illustrate example wireless network structures, according to aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, Internet protocol (IP) routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNB s 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
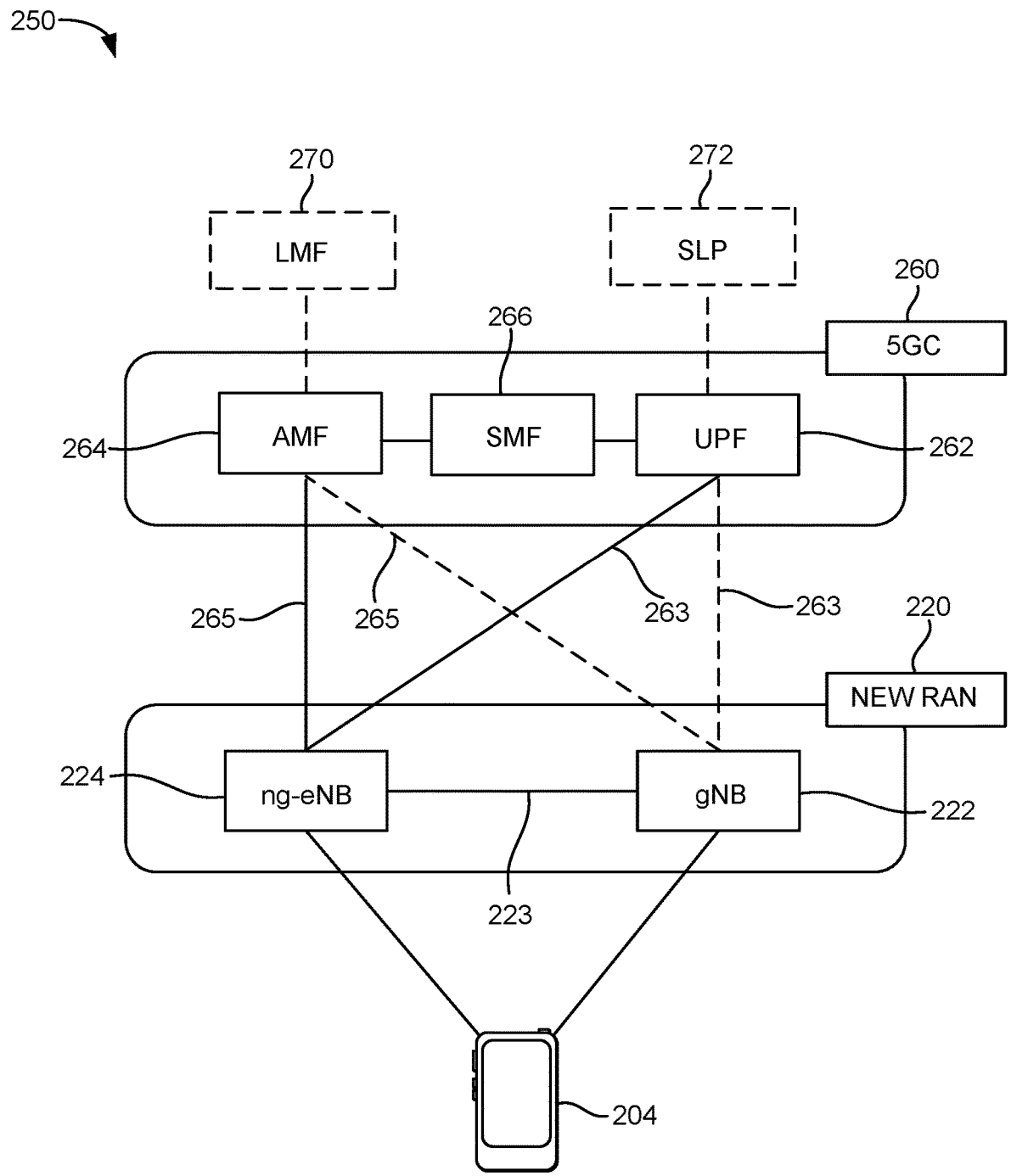

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE IP address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
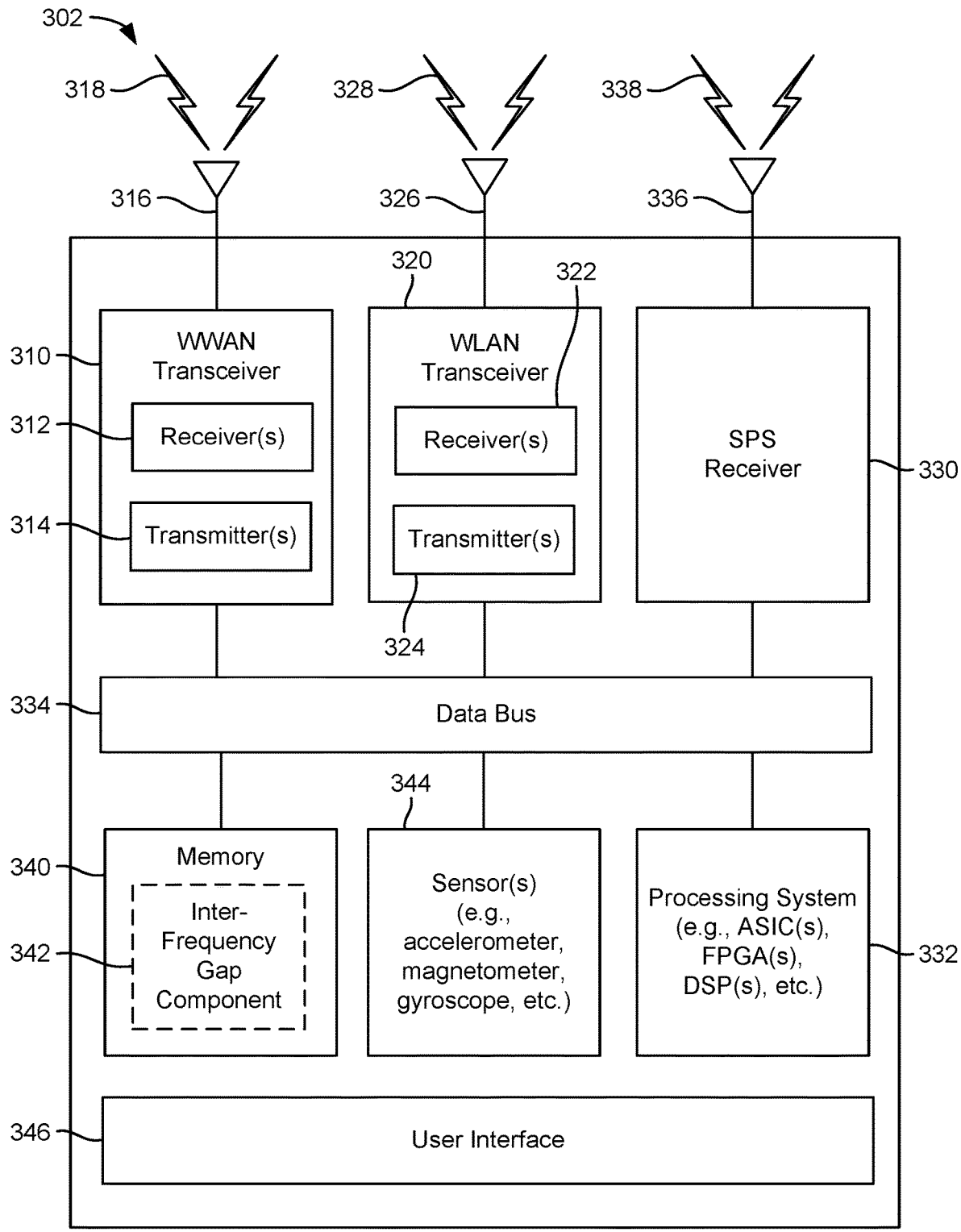
FIGS. 3A to 3C are simplified block diagrams of several sample aspects of components that may be employed in a UE, a base station, and a network entity, respectively.
Figure 3B:
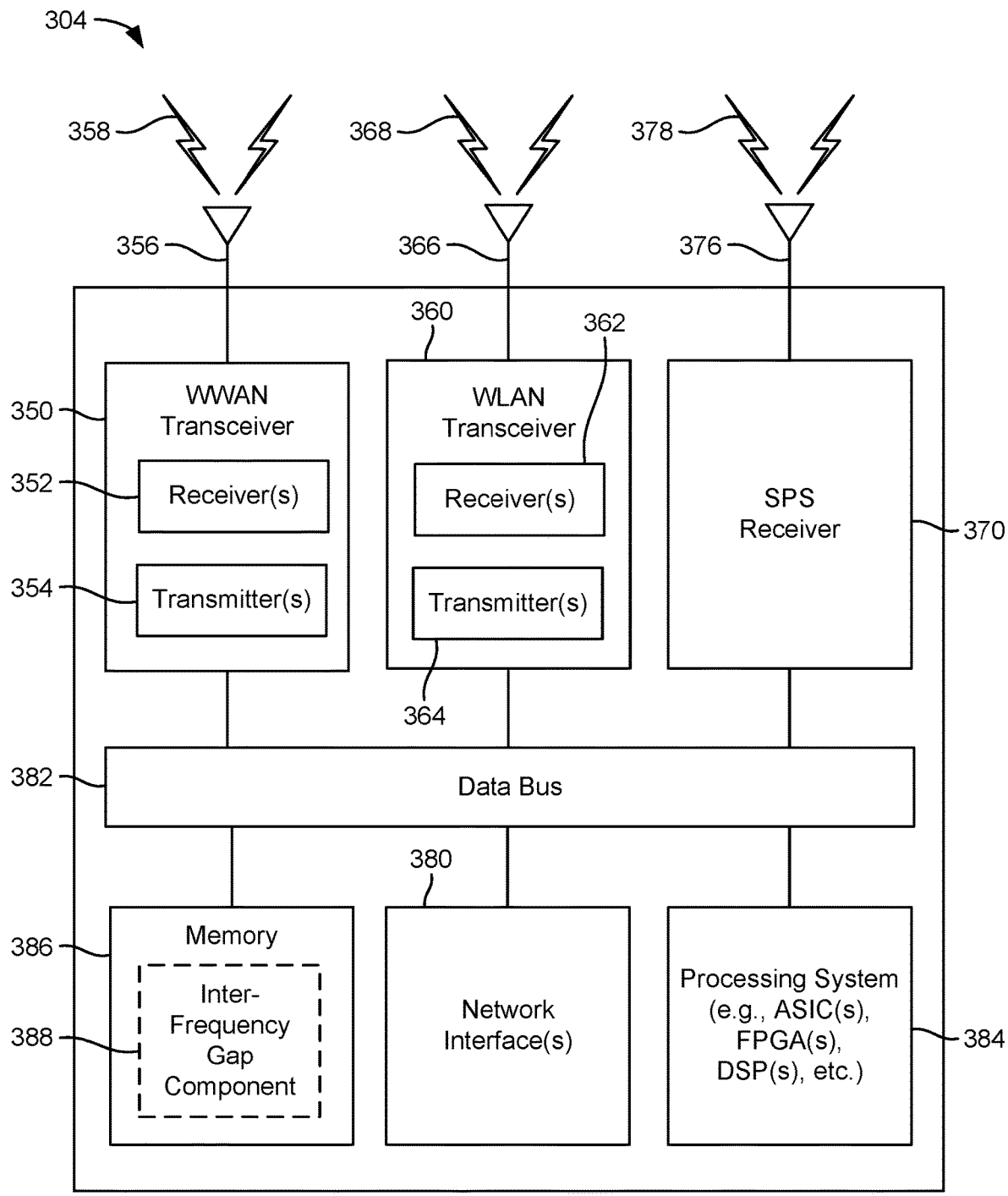
Figure 3C:
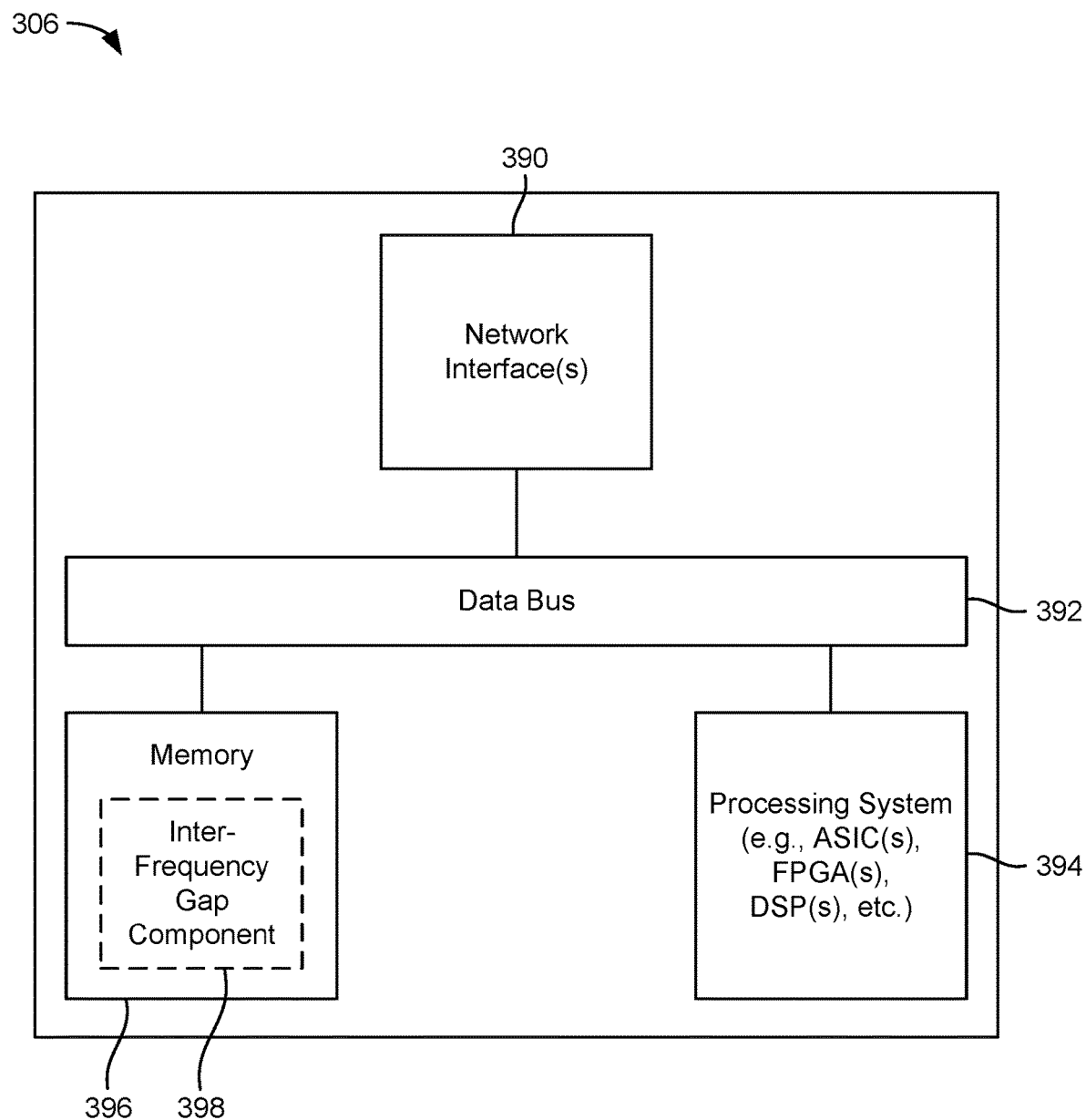

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230, the LMF 270, and the SLP 272) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., ng-eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interface 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, positioning operations, and for providing other processing functionality. The base station 304 includes a processing system 384 for providing functionality relating to, for example, positioning operations as disclosed herein, and for providing other processing functionality. The network entity 306 includes a processing system 394 for providing functionality relating to, for example, positioning operations as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include inter-frequency gap components 342, 388, and 398, respectively. The inter-frequency gap components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the inter-frequency gap components 342, 388, and 398 may be external to the processing systems 332, 384, and 394 (e.g., part of a modem processing system, integrated with another processing system, etc.). Alternatively, the inter-frequency gap components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide means for sensing or detecting movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIB s)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPS K), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TB s), demultiplexing of MAC SDUs from TB s, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the inter-frequency gap components 342, 388, and 398, etc.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell identifier (ID), the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270) may provide assistance data to the UE. For example, the assistance data may include identifiers of the base stations (or the cells/TRPs of the base stations) from which to measure reference signals, the reference signal configuration parameters (e.g., the number of consecutive positioning slots, periodicity of positioning slots, muting sequence, frequency hopping sequence, reference signal ID, reference signal bandwidth, slot offset, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4A:
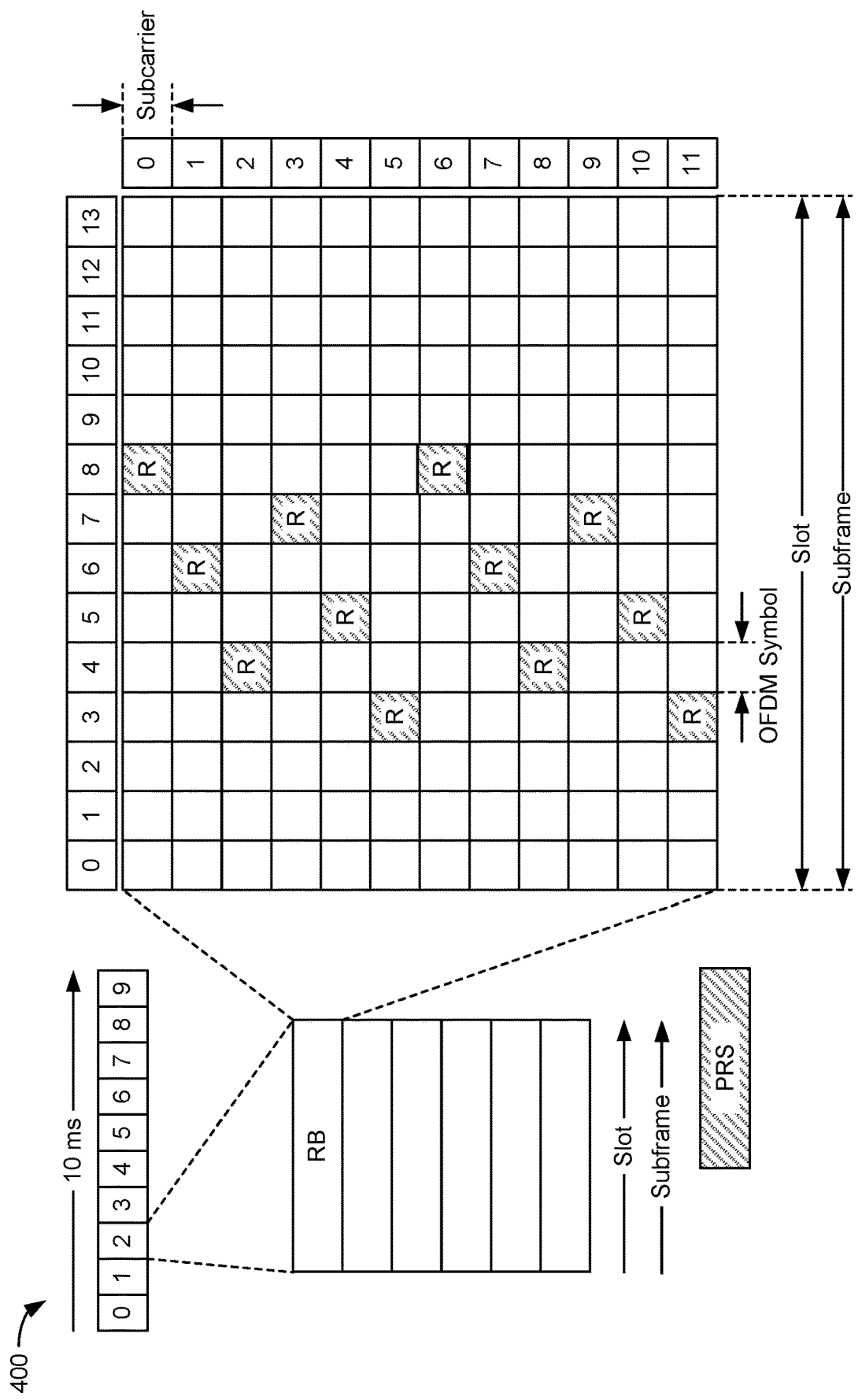
FIGS. 4A to 4D are diagrams illustrating examples of frame structures and channels within the frame structures, according to aspects of the disclosure.
Figure 4B:
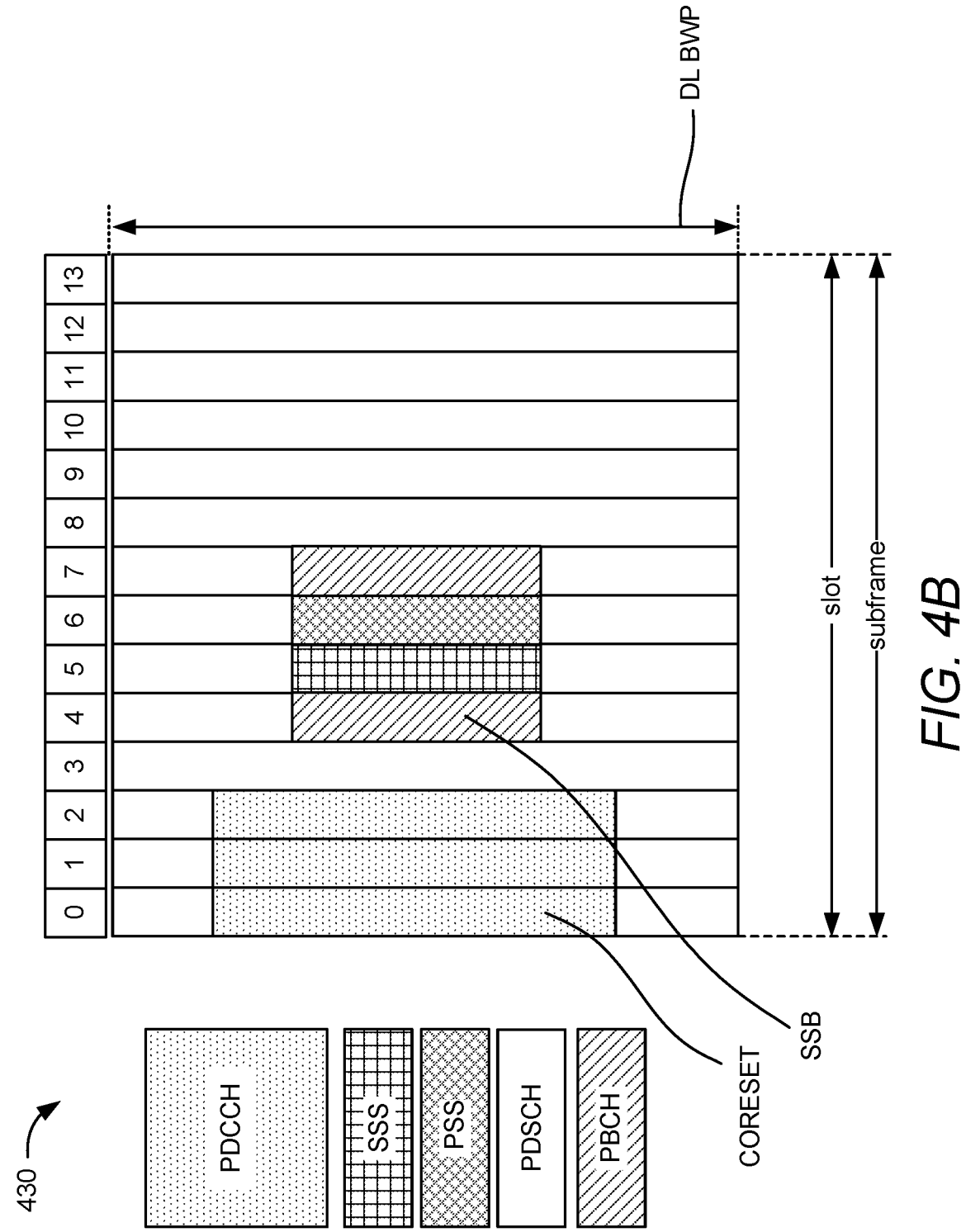
Figure 4C:
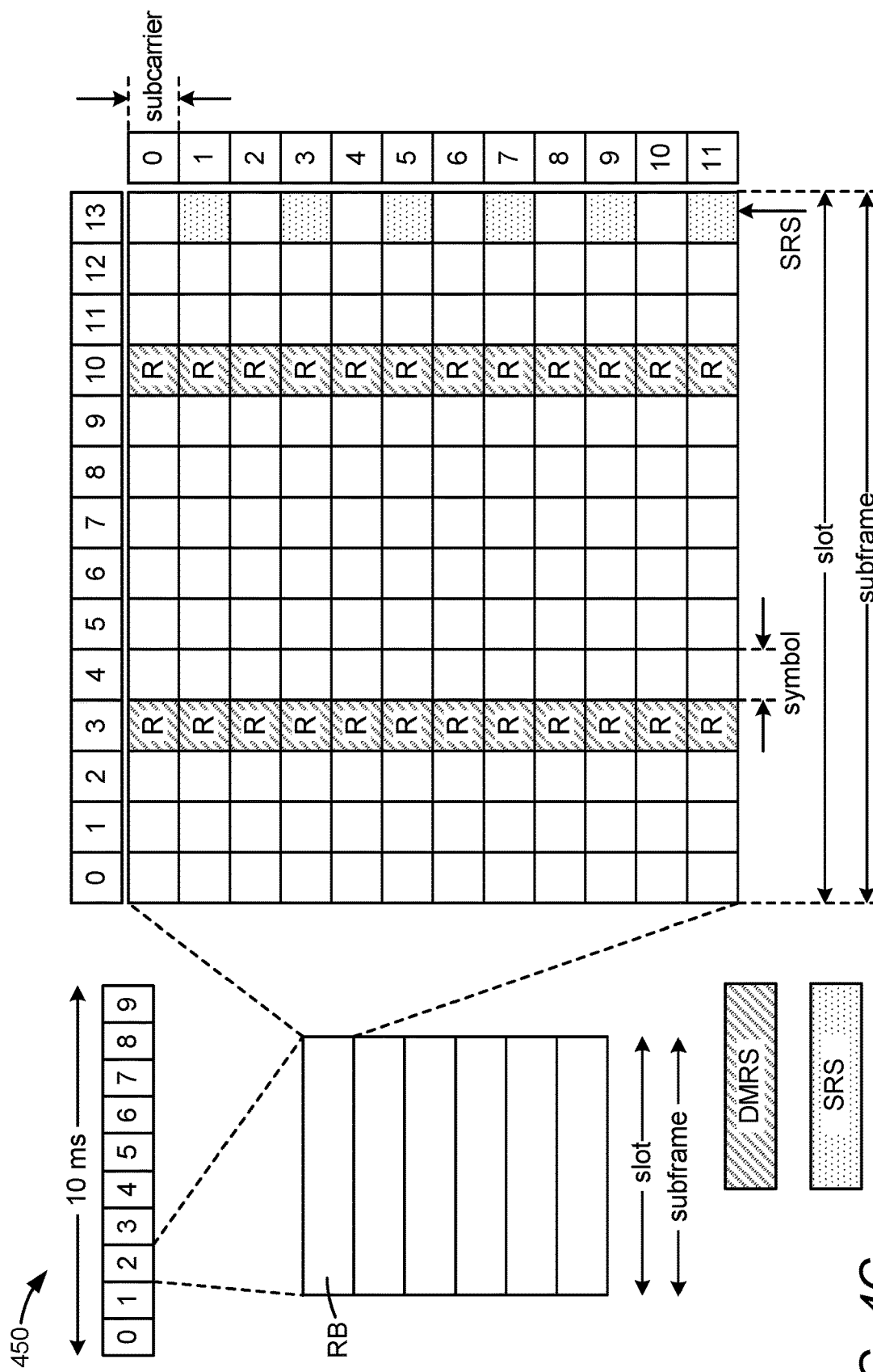
Figure 4D:
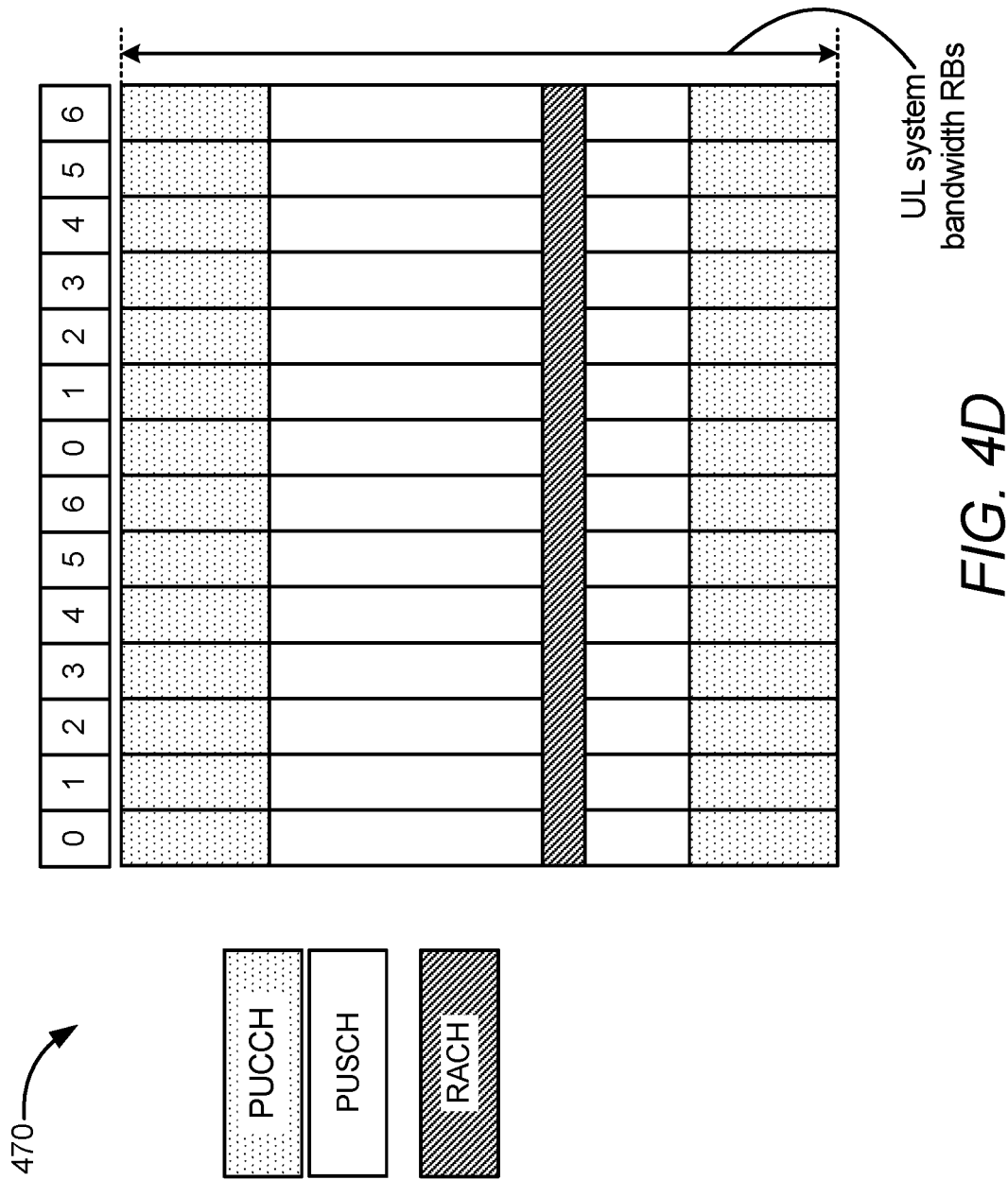

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. FIG. 4C is a diagram 450 illustrating an example of an uplink frame structure, according to aspects of the disclosure. FIG. 4D is a diagram 470 illustrating an example of channels within an uplink frame structure, according to aspects of the disclosure. Other wireless communications technologies may have different frame structures and/or different channels. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (μ), for example, subcarrier spacing of 15 kHz, 30 kHz, 60 kHz, 120 kHz, and 240 kHz or greater may be available. Table 1 provided below lists some various parameters for different NR numerologies.

TABLE 1

| SCS (kHz) | Symbols/ Sot | Slots/ Subframe | Slots/ Frame | Slot Duration (ms) | Symbol Duration (μs) | Max. nominal system BW (MHz) with 4 K FFT size |
|---|---|---|---|---|---|---|
| 0 15 | 14 | 1 | 10 | 1 | 66.7 | 50 |
| 1 30 | 14 | 2 | 20 | 0.5 | 33.3 | 100 |
| 2 60 | 14 | 4 | 40 | 0.25 | 16.7 | 100 |
| 3 120 | 14 | 8 | 80 | 0.125 | 8.33 | 400 |
| 4 240 | 14 | 16 | 160 | 0.0625 | 4.17 | 800 |

In the example of FIGS. 4A to 4D, a numerology of 15 kHz is used. Thus, in the time domain, a frame (e.g., 10 ms) is divided into 10 equally sized subframes of 1 ms each, and each subframe includes one time slot. In FIGS. 4A to 4D, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A to 4D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates exemplary locations of REs carrying PRS (labeled "R").

A collection of resource elements (REs) that are used for transmission of PRS is referred to as a "PRS resource." The collection of resource elements can span multiple PRBs in the frequency domain and 'N' (e.g., 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration.

Specifically, for a comb size 'N,' PRS are transmitted in every Nth subcarrier of a symbol of a PRB. For example, for comb-4, for each of the fours symbols of the PRS resource configuration, REs corresponding to every fourth subcarrier (e.g., subcarriers 0, 4, 8) are used to transmit PRS of the PRS resource. Currently, comb sizes of comb-2, comb-4, comb-6, and comb-12 are supported for DL-PRS. FIG. 4A illustrates an exemplary PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). In addition, the PRS resources in a PRS resource set have the same periodicity, a common muting pattern configuration, and the same repetition factor (e.g., PRS-ResourceRepetitionFactor) across slots. The periodicity may have a length selected from {4, 5, 8, 10, 16, 20, 32, 40, 64, 80, 160, 320, 640, 1280, 2560, 5120, 10240} slots, with =0, 1, 2, 3. The repetition factor may have a length selected from {1, 2, 4, 6, 8, 16, 32} slots.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter ARFCN-ValueNR (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS.

A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The PDSCH carries user data, broadcast system information not transmitted through the PBCH, such as system information blocks (SIB s), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

As illustrated in FIG. 4C, some of the REs (labeled "R") carry DMRS for channel estimation at the receiver (e.g., a base station, another UE, etc.). A UE may additionally transmit SRS in, for example, the last symbol of a slot. The SRS may have a comb structure, and a UE may transmit SRS on one of the combs. The comb structure (also referred to as the "comb size") indicates the pattern of subcarriers in each symbol period carrying a reference signal (here, SRS). For example, a comb size of comb-4 means that every fourth subcarrier of a given symbol carries the reference signal, whereas a comb size of comb-2 means that every second subcarrier of a given symbol carries the reference signal. In the example of FIG. 4C, the illustrated SRS is comb-2 over one symbol. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

A collection of resource elements that are used for transmission of SRS is referred to as an "SRS resource," and may be identified by the parameter SRS-ResourceId. The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID (SRS-ResourceSetId).

Generally, a UE transmits SRS to enable the receiving base station (either the serving base station or a neighboring base station) to measure the channel quality between the UE and the base station. However, SRS also can be used as uplink positioning reference signals for uplink positioning procedures, such as uplink time-difference of arrival (UL-TDOA), multi-round-trip-time (multi-RTT), downlink angle-of-arrival (DL-AoA), etc.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters SpatialRelationInfo and PathLoss-Reference are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

FIG. 4D illustrates an example of various channels within an uplink slot of a frame, according to aspects of the disclosure. A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Figure 5:
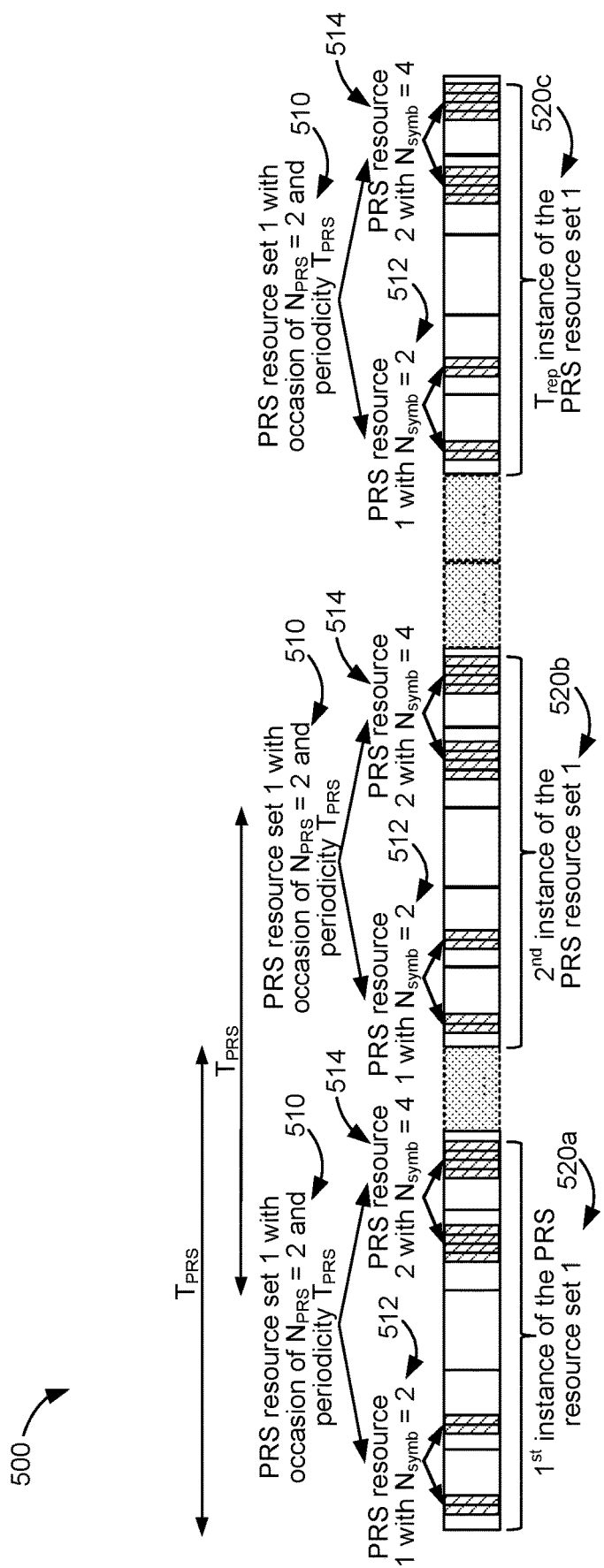
FIG. 5 is a diagram of an exemplary positioning reference signal (PRS) configuration for the PRS transmissions of a given base station, according to aspects of the disclosure.

FIG. 5 is a diagram of an exemplary PRS configuration 500 for the PRS transmissions of a given base station, according to aspects of the disclosure. In FIG. 5, time is represented horizontally, increasing from left to right. Each long rectangle represents a slot and each short (shaded) rectangle represents an OFDM symbol. The PRS configuration 500 identifies the PRS resources 512 and 514 of a PRS resource set 510 during which the base station transmits PRS. The PRS resource set 510 has an occasion length $N_{PRS}$ of two (2) slots and a periodicity of $T_{PRS}$ (e.g., 160 subframes or 160 ms). As such, both the PRS resources 512 and 514 are two consecutive slots in length and repeat every $T_{PRS}$ subframes, starting from the slot in which the first symbol of the respective PRS resource occurs.

In the example of FIG. 5, the PRS resource set 510 includes two PRS resources, a first PRS resource 512 (labeled "PRS resource 1" in FIG. 5) and a second PRS resource 514 (labeled "PRS resource 2" in FIG. 5). The PRS resource 512 and the PRS resource 514 may be transmitted on separate beams of the same base station. The PRS resource 512 has a symbol length $N_{symb}$ of two (2) symbols, and the PRS resource 514 has a symbol length $N_{symb}$ of four (4) symbols.

Each instance of the PRS resource set 510, illustrated as instances 520a, 520b, and 520c, includes an occasion of length '2' (i.e., $N_{PRS}$=2) for each PRS resource 512, 514 of the PRS resource set. The PRS resources 512 and 514 are repeated every $T_{PRS}$ subframes up to the muting sequence periodicity $T_{REP}$. As such, a bitmap of length $T_{REP}$ would be needed to indicate which occasions of instances 520a, 520b, and 520c are muted.

In an aspect, there may be additional constraints on a PRS configuration, such as PRS configuration 500 illustrated in FIG. 5. For example, for all PRS resources (e.g., PRS resources 512, 514) of a PRS resource set (e.g., PRS resource set 510), the base station can configure the following parameters to be the same: (a) the occasion length (e.g., $T_{PRS}$), (b) the number of symbols (e.g., $N_{symb}$), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE's capability to support the first and/or second option.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" refer to downlink or uplink positioning reference signals, unless otherwise indicated. A downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

A UE needs measurement gaps for PRS reception so that the UE will be able to allocate all of its processing capability to performing PRS measurements. A measurement gap (MG) is a configured period of time during which the serving cell refrains from transmitting to the UE so that the UE can receive transmissions (e.g., downlink reference signals) from other cells. The transmissions from the other cells may or may not be on the same frequency as the serving cell.

In legacy technologies, such as LTE, measurement gaps are only needed for inter-frequency or inter-RAT measurements. As such, at the start of a measurement gap, the UE tunes to the target frequency, then performs the measurement, and then tunes back to the source frequency at the end of the gap. No uplink transmission is permitted inside a measurement gap, as the UE is not synchronized to the uplink timing for inter-frequency or inter-RAT cells. This is applicable to both frequency division duplex (FDD) and tie division duplex (TDD) structures.

The measurement gap defined in NR is like the measurement gaps defined in LTE. There is an agreement between the UE and the serving base station that (1) the UE will not perform any uplink transmissions inside the measurement gap and (2) the base station will not transmit any downlink data inside the measurement gap. This is applicable for both TDD and FDD type measurements.

There is one type of measurement gap in NR, meaning the same type of measurement gap is to be used for both radio resource management (RRM) measurements (i.e., the measurements needed for an RRM report) and PRS measurements. In NR, the serving cell configures a UE with periodic measurement gaps during which the UE is expected to perform RRM measurements. In contrast, a UE needs to request measurement gaps for PRS measurements. It is up to UE implementation to prioritize PRS measurements over RRM measurements, since by default, RRM measurements will have a higher priority, and the UE may not be able to perform both at the same time. If a UE decides to perform PRS measurements rather than RRM measurements, a currently configured RRM measurement gap may not be useful (e.g., it may not coincide with a PRS transmission). In that case, the UE needs to request that the existing measurement gap be de-configured and request a new, differently configured, measurement gap. Currently, this exchange is accomplished through RRC signaling.

A UE should have information about when DL-PRS are scheduled to be transmitted by the serving base station and any neighboring base stations involved in the positioning session. This information is available from the location server in the PRS configuration, as described above with reference to FIG. 5. As such, the UE can determine when to request measurement gaps.

Figure 6:
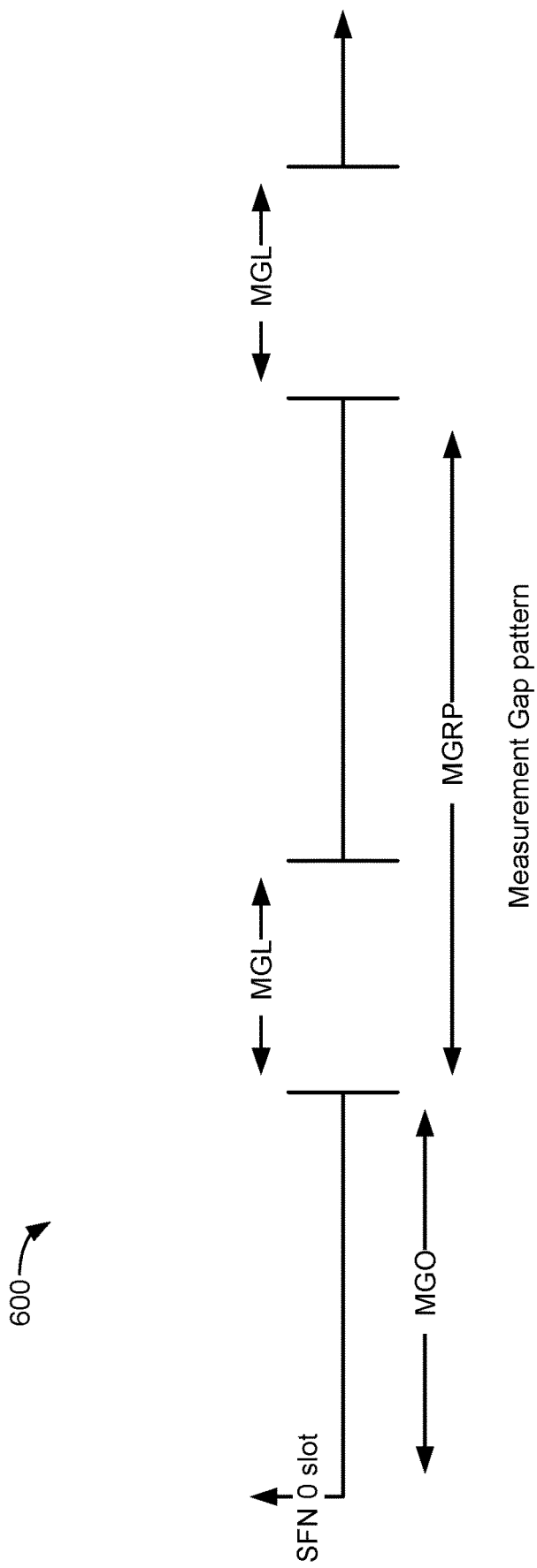
FIG. 6 is a diagram illustrating how the parameters of a measurement gap configuration specify a pattern of measurement gaps.

FIG. 6 is a diagram 600 illustrating how the parameters of a measurement gap configuration specify a pattern of measurement gaps. The measurement gap offset (MGO) is the offset of the start of the gap pattern from the start of a slot or subframe within the measurement gap repetition period (MGRP). There are currently about 160 offset values, but not all of the values are applicable for all periodicities. More specifically, the offset has a value in the range from '0' to one less than the MGRP. Thus, for example, if the MGRP is 20 ms, then the offset can range from '0' to '19.' The measurement gap length (MGL) is the length of the measurement gap in milliseconds. In NR Release 15, the measurement gap length can have a value (in milliseconds) selected from the set of {1.5, 3, 3.5, 4, 5.5, 6}. In NR Release 16, the measurement gap length may have a value (in milliseconds) selected from the set of {10, 18, 20, 34, 40, 50}. The MGRP defines the periodicity (in ms) at which the measurement gap repeats. Although not shown in FIG. 6, a measurement gap configuration may also include a measurement gap timing advance (MGTA) parameter. If configured, the MGTA indicates the amount of time before the occurrence of the slot or subframe in which the measurement gap is configured to begin. Currently, the MGTA can be 0.25 ms for FR2 or 0.5 ms for FR1.

Measurement reports (e.g., RS TD, RSRP, etc.) sent by a UE for UE-assisted positioning (e.g., OTDOA, DL-TDOA, RTT, DL-AOD, etc.) are based on measurements of downlink PRS (e.g., PRS, SSB, CSI-RS, etc.). These measurement reports are sent by the UE to a location server (e.g., location server 230, LMF 270, SLP 272) via, for example, LPP. Specifically, the messages are sent through the serving base station in NAS containers that the base station cannot read.

A DL-PRS configuration (e.g., as illustrated in FIG. 5) is independent of the UE's downlink BWP. That is, the PRS resources scheduled in the time domain (e.g., symbols, slots, etc.) may span up to the transmitting base station's entire operating frequency in the frequency domain (e.g., subcarriers, PRBs, etc.). However, in the frequency domain, the UE only measures the PRS resources that fall into its active downlink BWP. To measure a larger PRS bandwidth, the UE needs to request one or more measurement gaps to be provided by the serving base station. The UE can then measure PRS (or other downlink signaling) on its other downlink BWPs during the requested measurement gap(s).

In networks that have been deployed in unlicensed spectrum with frequency planning, each cell "neighboring" a UE (e.g., non-serving cell(s) within close enough proximity that wireless transmissions from each cell may be detected by the UE) generally operates on a different frequency than the UE's serving cell in order to mitigate interference between cells and at the UE. This is referred to as a frequency reuse greater than "1," as more than one frequency is being used in the vicinity of the UE. In contrast, networks that operate in the licensed spectrum generally have a frequency reuse of "1," meaning that all of the cells operate on the same frequency.

For example, in networks in which small cell base stations have been deployed in unlicensed (or "shared") spectrum, multiple cells near a UE may operate on different frequencies. This is to limit the self-interference within the network and transmission blocking due to LBT procedures utilized in unlicensed spectrum, and to take advantage of the larger bandwidth available in the unlicensed spectrum. For example, there may be 800 MHz of bandwidth available in a particular unlicensed frequency band (e.g., the 5 GHz unlicensed frequency band shared with WiFi), and each node may utilize 80 MHz of that bandwidth, for a frequency reuse of "10" (i.e., 800/80=10). In such network scenarios, there is typically no frequency overlap.

While this lack of bandwidth overlap is beneficial for data transmission (due to the reduction in interference among nodes), it is not preferable for positioning. Rather, for positioning, there is a strong preference to transmit PRS on the frequency in which the serving cell operates to avoid the time and power consumption of the UE switching from one frequency to another to measure PRS from different cells. In fact, a conventional UE is unlikely to be able to measure PRS from different cells operating on different frequencies, such as in an unlicensed spectrum deployment. Instead, the UE would need to measure PRS from cells operating on the same frequency, and therefore, likely need to rely on PRS from cells operating in the licensed spectrum.

This problem is partially addressed in NR by the concept of a "positioning BWP." The positioning BWP is a dedicated region in the time and frequency domains used by a serving cell for positioning (e.g., to transmit PRS). The positioning BWP is independent of the operating bandwidth of the serving cell, but is still within the operating bandwidth of the serving cell. For example, a serving cell may operate over a frequency bandwidth of 200 MHz, and may configure a UE with a BWP for data transmission that spans 100 MHz within that 200 MHz. However, for positioning, the base station may configure the UE with a positioning BWP that spans the full 200 MHz to enable the UE to perform more precise timing measurements of PRS from the serving cell.

While a positioning BWP may enable a UE to utilize more of the serving cell's operating bandwidth for positioning measurements, because a positioning BWP is still limited to the operating bandwidth of the serving cell, it does not enable the UE to measure other cell's reference signals, as those cells may be operating on different frequencies (in other bandwidths). As such, for positioning, the UE would still need to use a set of cells that operate on the same frequency, such as a set of cells in licensed spectrum. Accordingly, there remains a need to improve positioning within networks deployed with frequency reuse.

In the present disclosure, the network may configure inter-frequency measurement gaps during which the UE can measure PRS from neighboring cells operating on different frequencies than the serving cell. For downlink measurements, the scope of these inter-frequency measurement gaps can be extended to enable the UE to perform the RSTD measurements, for example, needed for positioning. To assist the UE in tuning to a neighboring cell during a measurement gap to measure PRS from that cell, a PRS configuration (e.g., PRS configuration 500) may include frequency domain information, such as the frequency and bandwidth of the neighboring cell, not just time domain information, such as the symbols and slots (e.g., as described above with reference to FIG. 5) during which the cell transmits PRS.

For example, where a network employs a frequency reuse of "3," meaning that there are three different frequency bands upon which the cells in the network operate, the UE may be configured with three measurement gaps, one for each frequency band. During each measurement gap, the UE would tune to a different frequency band and measure (e.g., obtain the ToA) the downlink PRS transmitted by the neighboring cell(s) operating in that frequency. At the end of the measurement gaps, the UE would report the measurements to the serving cell to be forwarded to the location server or other positioning entity to estimate a location of the UE, as described above.

The UE may (or may not) be able to assume that the deployment on different frequencies is synchronized. Even if synchronized, there may be some difference (e.g., a few hertz) between the frequency on which a cell is expected to be operating and the frequency on which the cell is actually operating. As such, the UE uses the reference cell (e.g., serving cell) for RSTD on the same frequency if no indication is provided. More specifically, for each frequency, the UE can choose a different cell as a reference cell, especially if no indication is provided. For example, the UE can use the serving cell on a given frequency as the reference cell for RSTD.

Because the UE blindly processes a new frequency when it switches to that new frequency during a measurement gap, the cells involved in the positioning operation can transmit a TRS along with each PRS resource to enable the UE to perform fine frequency offset compensation (after re-tuning). That is, the UE may be configured with a re-tuning gap for each frequency in addition to the measurement gap. Once the UE tunes to the new frequency during the re-tuning gap, it can detect the TRS and compensate for any frequency offset between the frequency to which it tuned (the expected frequency of the cell) and the actual frequency on which the cell to be measured operates. Then, during the subsequent measurement gap (which may occur immediately after the re-tuning gap, or some short period of time thereafter), the UE can measure the PRS transmitted in that cell.

For uplink transmissions, the UE is generally only permitted to transmit within the serving cell bandwidth. However, for certain types of positioning, such as RTT, the UE needs to be able to respond to a downlink reference signal from a neighboring cell with an uplink reference signal, such as an SRS, to the neighboring cell. Where the involved cells (neighboring and serving) operate on the same frequency, the UE only being able to transmit on the same frequency as the serving cell is not an issue. However, in a frequency reuse deployment, the UE needs to be able to transmit uplink reference signals to neighboring cells that operate on different frequencies than the serving cell.

Accordingly, in the present disclosure, the network can configure inter-frequency transmission gaps that a UE can use for uplink transmissions on different frequencies. During an inter-frequency transmission gap, the serving cell permits a UE to transmit uplink reference signals (e.g., SRS) on a different frequency, and therefore, to the cell(s) operating on that frequency. Like a measurement gap, the serving cell will refrain from transmitting to the UE during the transmission gap so that the UE does not miss any communications from the serving cell. After a transmission gap, or after a series of consecutive transmission gaps, the UE tunes back to the frequency of the serving cell.

The serving cell can configure the UE with all of the parameters needed to transmit to a different cell on a different frequency, such as the center frequency of the receiving cell, the bandwidth of the cell, the duration of the transmission gap, the uplink reference signal configuration, the duration of the uplink transmission, the path loss reference for the uplink transmission power, transmit beam sweeping parameters, etc.

Similar to the inter-frequency downlink operation described above, where a cell transmits a TRS with each PRS resource to enable the UE to correct for any frequency offset, the UE can transmit multiple SRS during a transmission gap to enable the receiving cell(s) to perform frequency offset estimation/correction. For example, the cell(s) can use the phase difference between the repeated SRS to estimate and correct for any frequency offset.

In an aspect, a UE can use a single gap during which the serving cell refrains from transmitting to the UE to perform both downlink reception and uplink transmission. That is, the UE does not need to be configured with separate gaps for PRS measurement (i.e., an inter-frequency measurement gap) and SRS transmission (i.e., an inter-frequency transmission gap), but rather, can use a single gap to tune to a different frequency, receive PRS on that frequency, then transmit SRS on that frequency.

In an alternative aspect, instead of the UE switching to a new frequency (e.g., the frequency of a non-serving cell), the non-serving cell(s) may instead switch to the UE's frequency and then listen to the SRS from the UE and transmit PRS to the UE on that frequency. However, this may result in a system-wide disruption if the cell cannot also continue operating on its assigned operating frequency. Even so, there may still be situations where this would be beneficial, even if there is a resultant system disruption, such as when there are a large number of UEs that need to be positioned at a given time. In that case, it would likely be more preferable for the cell to switch frequencies than for a large number of UEs to do so. For example, in a factory automation scenario, there may be tens to hundreds of UEs and only a handful of base stations. In that case, it would be advantageous for the base stations to switch to the frequency of the UEs during a positioning operation.

To determine the frequency on which the UE(s) is/are operating, the involved cells may be configured by the network with the frequency, or may scan different frequencies for SRS from the UE(s). Once an SRS is detected, the cells can transmit PRS on that frequency.

Figure 7:
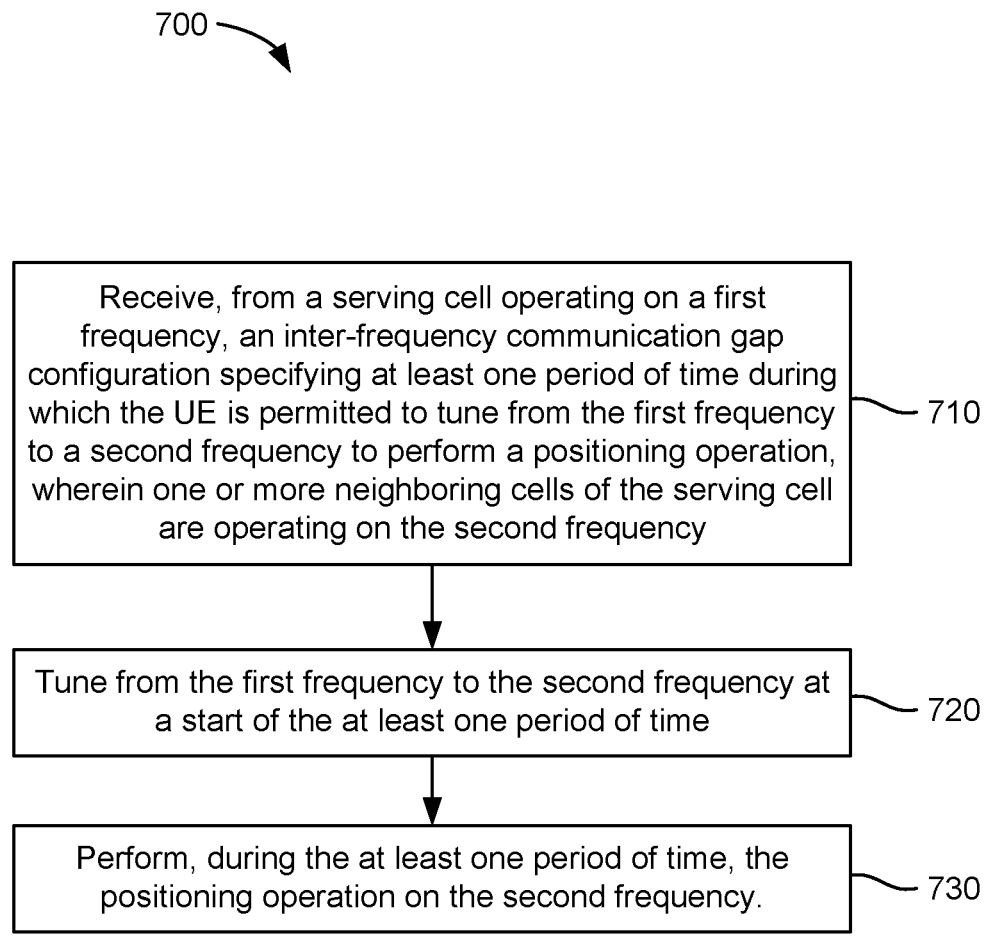
FIGS. 7 and 8 illustrate exemplary methods of wireless communication, according to aspects of the disclosure.

FIG. 7 illustrates an exemplary method 700 of wireless communication, according to aspects of the disclosure. In an aspect, the method 700 may be performed by a UE (e.g., any of the UEs described herein).

At 710, the UE receives, from a serving cell operating on a first frequency, an inter-frequency communication gap configuration specifying at least one period of time during which the UE is permitted to tune from the first frequency to a second frequency to perform a positioning operation, wherein one or more neighboring cells of the serving cell are operating on the second frequency. In an aspect, operation 710 may be performed by WWAN transceiver 310, processing system 332, memory component 340, and/or inter-frequency gap component 342, any or all of which may be considered means for performing this operation.

At 720, the UE tunes from the first frequency to the second frequency at a start of the at least one period of time. In an aspect, operation 720 may be performed by WWAN transceiver 310, processing system 332, memory component 340, and/or inter-frequency gap component 342, any or all of which may be considered means for performing this operation.

At 730, the UE performs, during the at least one period of time, the positioning operation on the second frequency. In an aspect, operation 730 may be performed by WWAN transceiver 310, processing system 332, memory component 340, and/or inter-frequency gap component 342, any or all of which may be considered means for performing this operation.

In an aspect, the first frequency may be a frequency in licensed spectrum and the second frequency may be a frequency in shared (e.g., unlicensed) spectrum. In an aspect, both the first frequency and the second frequency may be frequencies in shared spectrum.

In an aspect, the method 700 may further include (not shown) tuning from the second frequency to the first frequency at an end of the at least one period of time, and reporting a result of the positioning operation to a positioning entity (e.g., location server 230, LMF 270, SLP 272) using the first frequency.

In an aspect, performing the positioning operation at 730 may include receiving one or more PRS from the one or more neighboring cells, and measuring a ToA and/or an AoA of each of the one or more PRS. In an aspect, reporting the result of the positioning operation may include reporting the ToA and/or the AoA of each of the one or more PRS to the positioning entity. In an aspect, reporting the result of the positioning operation may further, or alternatively, include reporting an AoD of at least one uplink reference signal (e.g., SRS) transmitted to the one or more neighboring cells (e.g., as in the case of an RTT positioning procedure).

In an aspect, the method 700 may further include (not shown) receiving one or more PRS from the serving cell while tuned to the first frequency, and measuring a ToA and/or an AoA of each of the one or more PRS from the serving cell. In an aspect, the method 700 may further include calculating an RSTD measurement based on the ToA of each of the one or more PRS from the one or more neighboring cells and the ToA of each of the one or more PRS from the serving cell.

In an aspect, the inter-frequency communication gap configuration may be an inter-frequency measurement gap configuration, and the inter-frequency measurement gap configuration specifies the second frequency and a bandwidth of the second frequency. In an aspect, the inter-frequency communication gap configuration is part of a PRS configuration received from the serving cell.

In an aspect, the method 700 may further include (not shown) receiving, from the serving cell, a re-tuning gap configuration associated with the inter-frequency communication gap configuration, the re-tuning gap configuration specifying at least one second period of time during which the UE is permitted to tune from the first frequency to the second frequency to perform frequency offset compensation, tuning from the first frequency to the second frequency during the at least one second period of time, receiving, from the one or more neighbor cells on the second frequency, one or more reference signals (e.g., TRS) associated with each of the one or more PRS from the one or more neighboring cells, and compensating for any frequency offset associated with the second frequency based on the one or more reference signals. In an aspect, the at least one period of time and the at least one second period of time are contiguous periods of time. In an aspect, the inter-frequency communication gap configuration includes the re-tuning gap configuration.

In an aspect, performing the positioning operation at 730 may include transmitting at least one uplink reference signal (e.g., SRS) to the one or more neighboring cells on the second frequency during the at least one period of time. In an aspect, the inter-frequency communication gap configuration is an inter-frequency transmission gap configuration, and the inter-frequency transmission gap configuration specifies a center frequency of the one or more neighboring cells, a bandwidth of the one or more neighboring cells, a duration of the at least one period of time, a configuration of the at least one uplink reference signal, a duration of the at least one uplink reference signal, a path loss reference for uplink transmission power, transmit beam sweeping parameters, or any combination thereof.

In an aspect, transmitting the at least one uplink reference signal may include transmitting a plurality of uplink reference signals to enable the one or more neighboring cells to perform frequency offset compensation.

In an aspect, performing the positioning operation at 730 may further include receiving one or more PRS from the one or more neighboring cells on the second frequency during the at least one period of time. In an aspect, the one or more PRS are received and the at least one uplink reference signal is transmitted during an RTT positioning procedure performed between the UE and the one or more neighboring cells.

Figure 8:
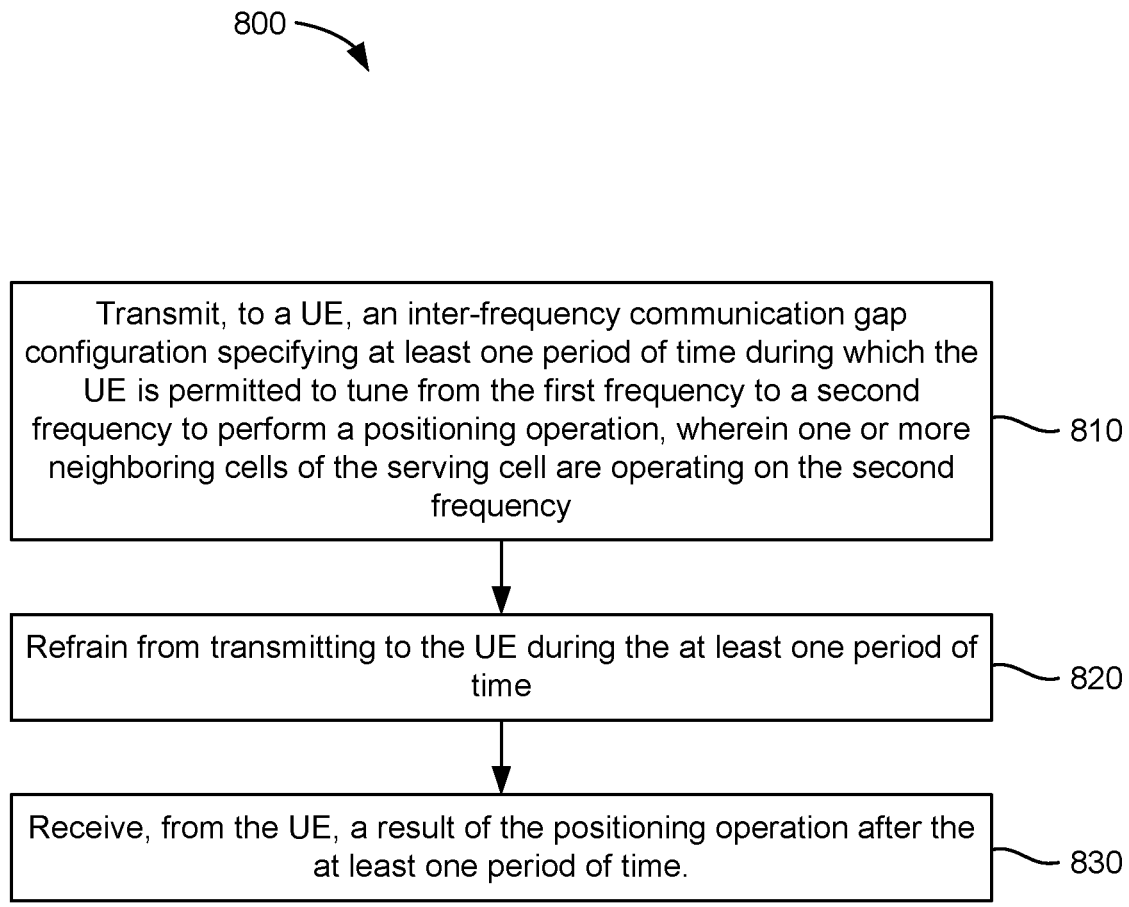

FIG. 8 illustrates an exemplary method 800 of wireless communication, according to aspects of the disclosure. The method 800 may be performed by a serving cell (e.g., of any of the base stations described herein) operating on a first frequency.

At 810, the service cell transmits, to a UE (e.g., any of the UEs described herein), an inter-frequency communication gap configuration specifying at least one period of time during which the UE is permitted to tune from the first frequency to a second frequency to perform a positioning operation, wherein one or more neighboring cells of the serving cell are operating on the second frequency. In an aspect, operation 810 may be performed by WWAN transceiver 350, processing system 384, memory component 386, and/or inter-frequency gap component 388, any or all of which may be considered means for performing this operation.

At 820, the serving cell refrains from transmitting to the UE during the at least one period of time. In an aspect, operation 820 may be performed by WWAN transceiver 350, processing system 384, memory component 386, and/or inter-frequency gap component 388, any or all of which may be considered means for performing this operation.

At 830, the service cell receives, from the UE, a result of the positioning operation after the at least one period of time. In an aspect, operation 830 may be performed by WWAN transceiver 350, processing system 384, memory component 386, and/or inter-frequency gap component 388, any or all of which may be considered means for performing this operation.

In an aspect, the first frequency may be a frequency in licensed spectrum and the second frequency may be a frequency in shared (e.g., unlicensed) spectrum. In an aspect, both the first frequency and the second frequency may be frequencies in shared spectrum.

In an aspect, the result of the positioning operation may be a ToA of each of one or more PRS received by the UE from the one or more neighboring cells. In an aspect, the result of the positioning operation may be one or more RSTD measurements based on ToAs of each of one or more PRS received by the UE from the one or more neighboring cells and a ToA of each of one or more PRS received by the UE from the serving cell.

In an aspect, the inter-frequency communication gap configuration may be an inter-frequency measurement gap configuration, and the inter-frequency measurement gap configuration may specify the second frequency and a bandwidth of the second frequency.

In an aspect, the inter-frequency communication gap configuration may be part of a PRS configuration sent to the UE.

In an aspect, the method 800 may further include (not shown) transmitting, to the UE, a re-tuning gap configuration associated with the inter-frequency communication gap configuration, the re-tuning gap configuration specifying at least one second period of time during which the UE is permitted to tune from the first frequency to the second frequency to perform frequency offset compensation.

As will be appreciated, by, for example, configuring a UE with inter-frequency measurement gaps, the methods 700 and 800 provide the technical advantage of improving positioning within networks deployed with frequency reuse.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
   receiving an inter-frequency communication gap configuration specifying at least one period of time during which the UE is permitted to tune from a first frequency to a second frequency to obtain one or more reference signal time difference (RSTD) measurements of a reference cell operating on the first frequency and one or more non-reference cells operating on the second frequency;
   tuning from the first frequency to the second frequency at a start of the at least one period of time;
   obtaining, during the at least one period of time, the one or more RSTD measurements;
   tuning from the second frequency to the first frequency at an end of the at least one period of time; and
   reporting the one or more RSTD measurements to a positioning entity using the first frequency.

2. The method of claim 1, wherein the first frequency comprises a frequency in licensed spectrum and the second frequency comprises a frequency in shared spectrum.

3. The method of claim 1, wherein the first frequency comprises a frequency in shared spectrum and the second frequency comprises a frequency in shared spectrum.

4. The method of claim 1, further comprising:
   receiving a positioning reference signal (PRS) configuration for the reference cell, wherein the PRS configuration specifies the first frequency and a bandwidth of the first frequency.

5. The method of claim 1, further comprising:
   receiving a PRS configuration for the one or more non-reference cells, wherein the PRS configuration specifies the second frequency and a bandwidth of the second frequency.

6. The method of claim 1, wherein the inter-frequency communication gap configuration is an inter-frequency measurement gap configuration.

7. The method of claim 1, further comprising:
   receiving a re-tuning gap configuration associated with the inter-frequency communication gap configuration, wherein the re-tuning gap configuration specifies at least one second period of time during which the UE is permitted to tune from the first frequency to the second frequency to perform frequency offset compensation.

8. The method of claim 7, further comprising:
   tuning from the first frequency to the second frequency during the at least one second period of time;
   receiving, from the one or more non-reference cells on the second frequency, one or more reference signals associated with each of one or more PRS from the one or more non-reference cells; and
   compensating for any frequency offset associated with the second frequency based on the one or more reference signals.

9. The method of claim 8, wherein the one or more reference signals are one or more tracking reference signals (TRS).

10. The method of claim 7, wherein the at least one period of time and the at least one second period of time are contiguous periods of time.

11. The method of claim 7, wherein the inter-frequency communication gap configuration includes the re-tuning gap configuration.

12. The method of claim 1, wherein the inter-frequency communication gap configuration is received from a serving cell of the UE.

13. The method of claim 12, wherein the reference cell is the serving cell.

14. A method of wireless communication performed by a serving cell operating on a first frequency, comprising:
    transmitting, to a user equipment (UE), an inter-frequency communication gap configuration specifying at least one period of time during which the UE is permitted to tune from the first frequency to a second frequency to perform a positioning operation, wherein the positioning operation comprises obtaining one or more reference signal time difference (RSTD) measurements of a reference cell operating on the first frequency and one or more non-reference cells operating on the second frequency, and wherein one or more neighboring cells of the serving cell are operating on the second frequency; and
    refraining from transmitting to the UE during the at least one period of time.

15. The method of claim 14, wherein the first frequency comprises a frequency in licensed spectrum and the second frequency comprises a frequency in shared spectrum.

16. The method of claim 14, wherein the first frequency comprises a frequency in shared spectrum and the second frequency comprises a frequency in shared spectrum.

17. The method of claim 14, further comprising:
    receiving, from the UE, a result of the positioning operation after the at least one period of time.

18. The method of claim 17, wherein the serving cell is the reference cell and the one or more neighboring cells are the one or more non-reference cells.

19. The method of claim 17, wherein the one or more RSTD measurements are based on ToAs of each of one or more positioning reference signals (PRS) received by the UE from the one or more neighboring cells and a ToA of each of one or more PRS received by the UE from the serving cell.

20. The method of claim 14, wherein:
the inter-frequency communication gap configuration is an inter-frequency measurement gap configuration, and
the inter-frequency measurement gap configuration specifies the second frequency and a bandwidth of the second frequency.

21. The method of claim 14, wherein the inter-frequency communication gap configuration is part of a PRS configuration sent to the UE.

22. The method of claim 14, further comprising:
transmitting, to the UE, a re-tuning gap configuration associated with the inter-frequency communication gap configuration, the re-tuning gap configuration specifying at least one second period of time during which the UE is permitted to tune from the first frequency to the second frequency to perform frequency offset compensation.

23. A user equipment (UE), comprising:
one or more memories;
one or more transceivers; and
one or more processors communicatively coupled to the one or more memories and the one or more transceivers, the one or more processors, either alone or in combination, configured to:
receive, via the one or more transceivers, an inter-frequency communication gap configuration specifying at least one period of time during which the UE is permitted to tune from a first frequency to a second frequency to obtain one or more reference signal time difference (RSTD) measurements of a reference cell operating on the first frequency and one or more non-reference cells operating on the second frequency;
tune from the first frequency to the second frequency at a start of the at least one period of time;
obtain, during the at least one period of time, the one or more RSTD measurements;
tune from the second frequency to the first frequency at an end of the at least one period of time; and
report the one or more RSTD measurements to a positioning entity using the first frequency.

24. The UE of claim 23, wherein the first frequency comprises a frequency in licensed spectrum and the second frequency comprises a frequency in shared spectrum.

25. The UE of claim 23, wherein the first frequency comprises a frequency in shared spectrum and the second frequency comprises a frequency in shared spectrum.

26. The UE of claim 23, wherein the inter-frequency communication gap configuration is an inter-frequency measurement gap configuration.

27. The UE of claim 23, wherein the one or more processors, either alone or in combination, are further configured to:
receive, via the one or more transceivers, a re-tuning gap configuration associated with the inter-frequency communication gap configuration, wherein the re-tuning gap configuration specifies at least one second period of time during which the UE is permitted to tune from the first frequency to the second frequency to perform frequency offset compensation.

28. A serving cell, comprising:
one or more memories;
one or more transceivers; and
one or more processors communicatively coupled to the one or more memories and the one or more transceivers, the one or more processors, either alone or in combination, configured to:
transmit, via the one or more transceivers, to a user equipment (UE), an inter-frequency communication gap configuration specifying at least one period of time during which the UE is permitted to tune from the first frequency to a second frequency to perform a positioning operation, wherein the positioning operation comprises obtaining one or more reference signal time difference (RSTD) measurements of a reference cell operating on the first frequency and one or more non-reference cells operating on the second frequency, and wherein one or more neighboring cells of the serving cell are operating on the second frequency; and
refrain from transmitting to the UE during the at least one period of time.

29. The serving cell of claim 28, wherein the first frequency comprises a frequency in licensed spectrum and the second frequency comprises a frequency in shared spectrum.

30. The serving cell of claim 28, wherein the first frequency comprises a frequency in shared spectrum and the second frequency comprises a frequency in shared spectrum.

* * * * *